INVENTOR
A. J. PERNESKI
BY Herbert M. Shapiro
ATTORNEY

United States Patent Office 3,541,535

Patented Nov. 17, 1970

3,541,535

DOMAIN PROPAGATION ARRANGEMENT HAVING REPETITIVE PATTERNS OF OVERLAY MATERIAL OF DIFFERENT COERCIVE FORCES

Anthony J. Perneski, Martinsville, N.J., assignor to Bell Telephone Laboratories, Incorporated, Murray Hill and Berkeley Heights, N.J., a corporation of New York Filed Dec. 18, 1968, Ser. No. 784,741
Int. Cl. G11c *19/00, 11/14*
U.S. Cl. 340—174 8 Claims

ABSTRACT OF THE DISCLOSURE

An arrangement for moving single wall domains in a sheet of magnetic material employs magnetic overlays of different coercive forces. The overlays respond to changing in-plane fields for generating magnetic pole patterns which attract single wall domains to next consecutive positions in a propagation channel defined by the overlays.

FIELD OF THE INVENTION

This invention relates to data processing arrangements and more particularly to such arrangements including a sheet of magnetic material in which single wall domains are propagated.

BACKGROUND OF THE INVENTION

A single wall domain is a magnetic domain which is bounded by a single domain wall closing upon itself and having a geometry independent of or, in other words, unconstrained by the boundary of the sheet in the plane in which the domain is moved. The domain conveniently assumes the shape of a circle and has a stable diameter determined by the material parameters. A bias field of a polarity to contract domains insures movement of domains as stable entities. The Bell System Technical Journal, vol. XLVI, No. 8, October 1967, at pages 1901 et seq., describes the propagation of single wall domains in a propagation medium such as a rare earth orthoferrite.

The movement of domains is accomplished normally by the sequential pulsing of discrete propagation conductors for generating consecutive offset fields (viz, field gradients) of a polarity to attract domains. In this manner, a domain follows the consecutive attracting fields from input to output positions in the sheet. A three-phase propagation operation provides the directionality along a selected propagation path in a manner consistent with the teaching of the prior art.

The propagation conductor pattern assumes a geometry dictated by the material in which the domins are moved. A typical material is a rare earth orthoferrite. These materials have preferred directions of magnetization substantially normal to the plane of the sheet. If we adopt the convention that a sheet is saturated magnetically in a negative direction along an axis normal to the plane of the sheet, the magnetization of a single wall domain is in the other or positive direction along that axis. The domain then may be represented as an encircled plus sign where the circle represents the single domain wall. The propagation conductor pattern is conveniently in the form of consecutively offset closed loops to correspond to the circular geometry of the domain.

Single wall domains having diameters far smaller than the smallest achievable conductor geometries exist. Consequently, the potential packing densities of suitable magnetic sheets cannot presently be realized unless the constraint of discrete propagation conductors is eliminated. For example, a typical minimum achievable dimension for discrete propagation conductors is in the order of mils permitting perhaps fifty thousand bits per square inch. But domains on the order of submicrons have been observed permitting packing densities of many millions of bits per square inch.

An object of this invention is to provide a domain propagation device in which discrete propagation conductors are absent.

My copending application Ser. No. 726,454 filed May 3, 1968 discloses one implementation for achieving the propagation of single wall domains in the absence of discrete propagation conductors. The implementation requires an overlay of magnetically soft material of a geometry to generate moving magnetic pole patterns when an in-plane field is rotated in the sheet of material in which the domains are moved. The domains follow the changing pole patterns from input to associated output positions.

BRIEF DESCRIPTION OF THE INVENTION

The present invention employs an overlay of magnetic material to generate moving magnetic pole patterns in much the same manner. But in this instance, overlays of different coercivities are employed. Relatively low power requirements and higher margins result. In one embodiment, consecutive overlay rectangles are aligned in parallel sets of three, each set being offset from next adjacent sets. Each set, also, comprises a low, medium, and high coercivity rectangle. A domain is moved by magnetic pole patterns generated in the overlays in response to an in-plane field increasing in magnitude along a first direction parallel to the long direction of the rectangles, followed by an increase in magnitude in the opposite direction. In another embodiment, a similar result is achieved with only high and relatively low coercivity overlay rectangles similarly aligned.

DETAILED DESCRIPTION

Figures 1, 15:
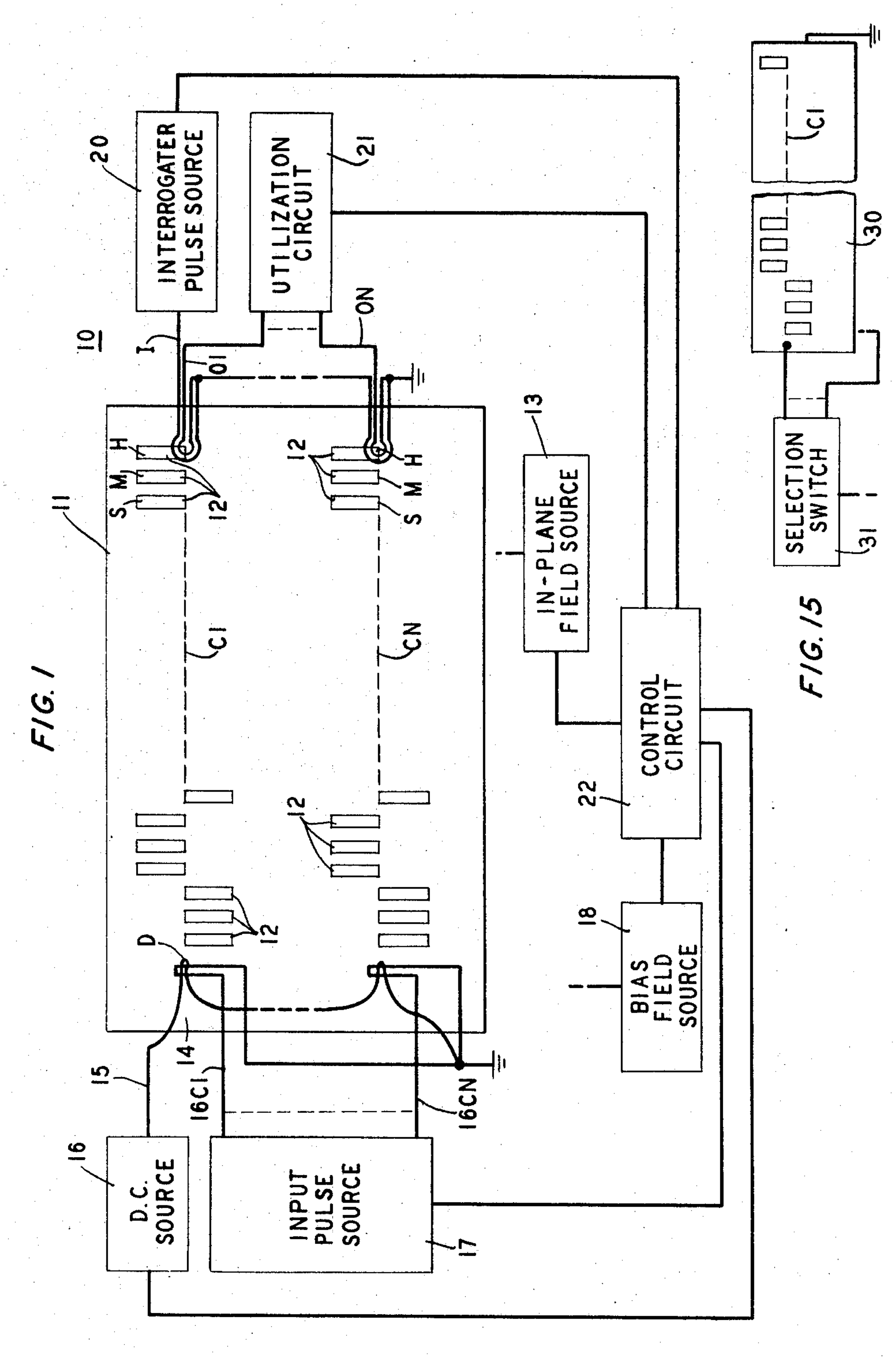
FIG. 1 is a schematic representation of an arrangement in accordance with this invention.
FIGS. 8 through 15 are schematic representations of portions of alternative arrangements in accordance with this invention.

FIG. 1 shows a domain propagation arrangement 10 in accordance with this invention. The arrangement comprises a sheet 11 of a magnetic material in which single wall domains can be moved. Channels C1 . . . CN for propagating such domains are defined by overlays 12.

The overlays 12 are shown as rectangles, the long dimensions of which are oriented perpendicular to the axis of the propagation channels. The rectangles are grouped in sets of three, next consecutive sets being offset from one another as shown in the figure. In accordance with this invention, the rectangles of each set are magnetically soft, medium, and hard, increasing in coercive force in the direction of domain movement, illustratively, from left to right in FIG. 2. Typically, the rectangles have coercive forces of zero, five, and ten oersteds.

The rectangles exhibit strong attracting poles when an in-plane field is oriented parallel to the long direction of the rectangles. It is convenient to designate the attracting pole as a plus sign and to shown single wall domains only as circles. It should be clear, however, that for the assumed convention, positive poles (+) attract domains if the overlays are on the underside of sheet 11 and that negative poles (−) attract domains if the overlays are on the top surface of sheet 11. The in-plane field source is repreesnted by a block 13 and may comprise a pair of spaced apart coils oriented orthogonal to sheet 11 along the axis of the channels. A pair of coils is employed, conveniently, for insuring uniform in-plane fields throughout sheet 11.

Domains are supplied selectively to the propagation channels from a source 14 of magnetization which is positive for the convention adopted. Source 14 comprises a portion of sheet 11 which is separated from the remainder of the sheet by a domain wall which is coincident with a conductor 15. Conductor 15 is connected between a D.C. source 16 and ground and normally has a current flowing therein to provide a positive field in the portion of sheet 11 comprising source 14 and negative in the remainder.

Conductor 15 is formed to provide protrusions extending to the right, as viewed in FIG. 1, in the direction of the channels. Input conductors 16C1 . . . 16CN, of hairpin geometry intersect those protrusions. The input conductors are connected to an input pulse source 17 and ground. When a pulse is applied to a selected input conductor, say conductor 16C1 of FIG. 1, the portion of sheet 11 between the hairpin of the selected conductor is driven negative and a portion D of FIG. 1 is separated from source 14. In response to an in-plane field H of FIG. 2, portion D moves to the top of the adjacent rectangle as viewed in FIG. 2.

The range of permissible stable diameters for domain D is determined by the material parameters and is fixed for a given material by a bias field normal to sheet 11 and of a polarity to contract domains. The bias field is supplied by a source represented by block 18 in FIG. 1 and comprises conveniently a coil encompassing sheet 11 and oriented in the plane of that sheet.

Domain movement is carried out in accordance with this invention in response to an in-plane field growing in magnitude along a first direction parallel to the long dimension of the rectangles 12 and then growing in the opposite direction along that dimension. The movement of a domain in a representative entrance portion of propagation channel C1 is shown in FIGS. 2 through 7 along with the corresponding in-plane fields for causing that movement. It is convenient to designate the fields of magnitudes exceeding the coercive force of the soft, medium, and hard overlays as $H_S$, $H_M$, and $H_H$.

Figure 2:
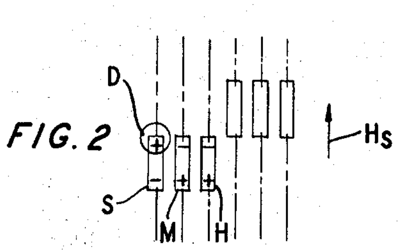
FIGS. 2, 3, 4, 5, 6, and 7 are schematic representations of a portion of the arrangement of FIG. 1 showing magnetic conditions therein during operation along with indications of the in-plane field producing those conditions.
Figure 3:
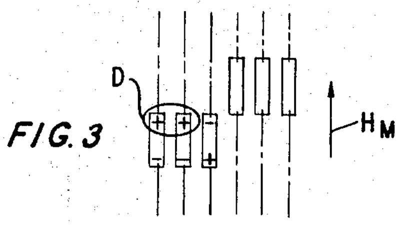
Figure 4:
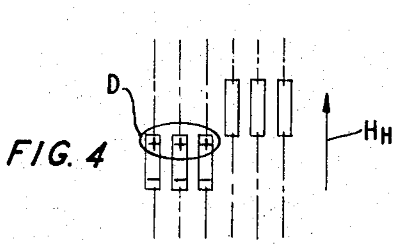

Consider the situation when conductor 16C1 of FIG. 1 is pulsed when the field $H_S$ of FIG. 2 is applied. Domain D moves to the top of the soft magnetic overlay (S). When the in-plane field is increased as indicated by arrow $H_M$ in FIG. 3, domain D expands to the position shown in FIG. 3. When the in-plane field is increased again as indicated by the arrow $H_H$ as shown in FIG. 4, domain D again expands as shown in that figure. Only the pertinent pole concentrations are indicated.

Figure 5:
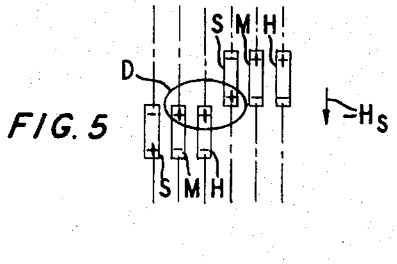
Figure 6:
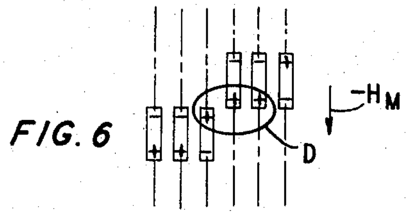
Figure 7:
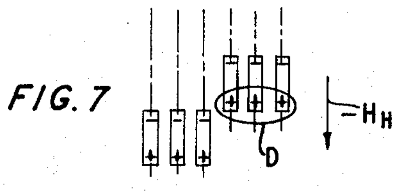

The in-plane field is now reversed and the magnitude of the field is low as indicated by the arrow $-H_S$ of FIG. 5. The soft magnetic rectangles (S) switch, the others (M and H) do not. The domain, consequently, moves to the position shown in FIG. 5. The in-plane field is now increased to $-H_M$ and thereafter to $-H_H$; domain D moves to the positions shown in FIGS. 6 and 7 in response. The process repeats, advancing a domain one stage for each full cycle of the in-plane field until a domain is advanced to an output position.

Since the in-plane field alternates along a single axis, substantially less power is required than is utilized for propagation in response to rotating in-plane fields; since each domain coincides with an attracting pole concentration in each instance, relatively large variations in bias field can be tolerated.

A convenient output implementation is shown in FIG. 1. An interrogate conductor couples output positions defined at the bottom of terminal rectangles (H) as shown in FIG. 1 for channels C1 and CN. Conductor I is connected between an interrogate pulse source 20 and ground and serves to collapse domains at the coupled positions when pulsed. Output conductors 01 . . . 0N also couple the output positions Each of these conductors is connected between a utilization circuit 21 and ground. Whenever an interrogate pulse is applied to conductor I, any domains occupying output positions are collapsed and pulses are induced in associated output conductors for detection by utilization circuit 21.

The various sources and circuits are connected to a control circuit 22 for synchronization and activation and may be any such elements capable of operating in accordance with this invention.

It has been shown that a domain (binary one) advances in a representative stage as the in-plane field reverses. Of course, a domain in each stage advances similarly. If input pulse source 17 is not activated in an allocated input time slot, an absence of a domain (binary zero) is provided for propagation and is advanced similarly.

Figure 8:
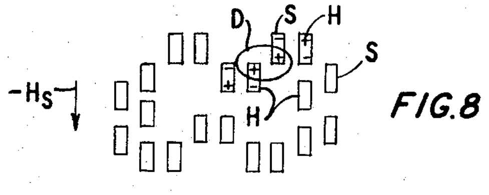
Figure 9:
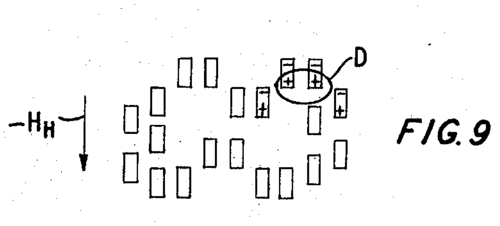
Figure 10:
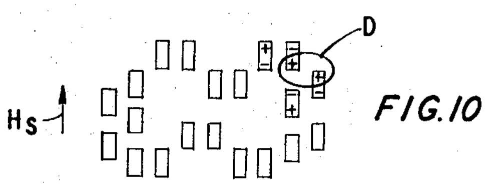
Figure 11:
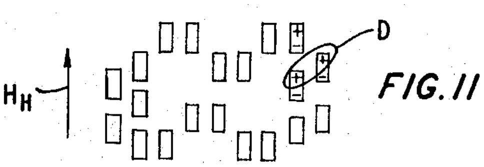
Figure 12:
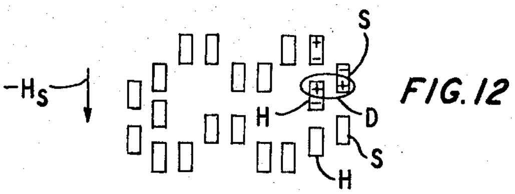
Figure 13:
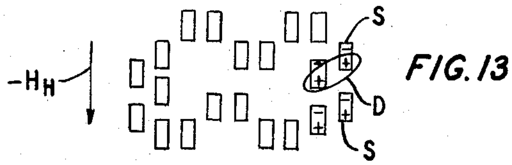

Similar results can be achieved by overlay rectangles arranged in pairs of magnetically soft and hard materials. It is also frequently convenient to recirculate information as, for example, in a drum or disk arrangement. FIG. 8 shows one such recirculating arrangement in accordance with this invention based on a propagation arrangement including only magnetically soft and hard overlay rectangles.

Figure 14:
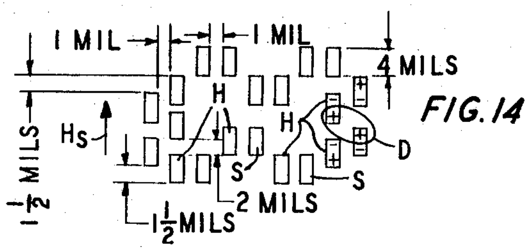

The in-plane field functions in this embodiment as in the embodiment of FIGS. 2–7 but in fewer increments. The movement of a domain is depicted in a vertical portion of a channel interconnecting two horizontal portions as viewed in FIGS. 8–14. It is seen that a domain can be moved by an alternating and increasing in-plane field, along a vertical channel as well as along a horizontal channel. Also, movement along the lower channel is from right to left, the magnetically softer material in each overlay pair there being to the right as viewed. The spacings between the rectangle sets for movement in the vertical direction are chosen to insure movement as depicted. Typically, for one and one-half mil domains, the rectangles are one mil by four mils spaced one mil apart and offset one and one-half mil for vertical movement as shown in FIG. 14. Like rectangles are spaced one mil apart for horizontal movement. For 0.1 mil domains, the rectangle dimensions and spacings can be reduced by about an order of magnitude.

As long as the in-plane fields are generated uniformly in sheet 11, all domains move in a like manner depending on the overlay configuration. The arrangement of FIG. 15, on the other hand, permits movement of domains along selected channels only. As depicted in FIG. 15, a solenoid 30 overlies each channel as shown for channel C1 of FIG. 1 only. Each such solenoid is connected between a selection switch 31 and ground. Signals are applied to a selected solenoid to generate the requisite in-plane fields only in the associated channel thus permitting selective movement of domains.

What has been described is considered only illustrative of the principles of this invention. Accordingly, other and varied modifications may be made therein by one skilled in the art without departing from the spirit and scope of this invention.

What is claimed is:

1. A domain propagation arrangement comprising a sheet of magnetic material in which single wall domains can be moved, means for selectively providing single wall domains in said sheet, means for providing in-plane fields in different orientations in said sheet, means for defining in said sheet propagation channels for single wall domains responsive to said in-plane fields, said last-mentioned means comprising repetitive patterns of overlay material of different coercive forces for generating movinput pole patterns which attract single wall domains from input to associated output positions, and means for detecting the presence and absence of domains at said output positions.

2. An arrangement in accordance with claim 1 wherein said repetitive patterns of overlay materials comprise sets of rectangles, each of said sets comprising soft, medium, and hard magnetic rectangles.

3. An arrangement in accordance with claim 1 wherein said repetitive patterns of overlay materials comprise pairs of rectangles, each of said pairs comprising relatively soft and relatively hard magnetic rectangles.

4. An arrangement in accordance with claim 2 wherein said means for providing in-plane fields comprises means for providing fields alternately in first and second directions parallel to the long dimension of said rectangles, and means for changing the amplitude of said fields to exceed in order the coercive force of the soft, medium, and hard magnetic rectangles during each alternation.

5. An arrangement in accordance with claim 3 wherein said means for providing in-plane fields comprises means for providing fields alternately in first and second directions along the axis of the long dimension of said rectangles, and means for changing the amplitude of said fields to exceed in order the coercive force of the relatively soft then the relatively hard magnetic rectangles during each alternation.

6. An arrangement in accordance with claim 4 including a solenoid next adjacent each of said channels and means for pulsing said solenoids selectively in a manner to supply said in-plane fields.

7. An arrangement in accordance with claim 5 including a solenoid next adjacent each of said channels and means for pulsing said solenoids selectively in a manner to supply said in-plane fields.

8. An arrangement in accordance with claim 1 including means for interconnecting said channels for recirculating domains therein.

References Cited

UNITED STATES PATENTS

| | | | |
|---|---|---|---|
| 3,140,471 | 7/1964 | Fuller | 340—174 |
| 3,230,515 | 1/1966 | Smaller | 340—174 |
| 3,480,925 | 11/1969 | Michaelis | 340—174 |

STANLEY M. URYNOWICZ, JR., Primary Examiner